United States Patent [19]

Lucienne et al.

[11] Patent Number: 5,330,132
[45] Date of Patent: Jul. 19, 1994

[54] FORCE-LIMITING DEVICE FOR AN AIRCRAFT LANDING GEAR SHOCK ABSORBER, AND A SHOCK ABSORBER INCLUDING SUCH A DEVICE

[75] Inventors: Philippe Lucienne, Aumont; Albert De Pindray, Magny-les-Hameaux, both of France

[73] Assignee: Messier-Bugatti, Velizy-Villacoublay, France

[21] Appl. No.: 984,521

[22] Filed: Dec. 2, 1992

[30] Foreign Application Priority Data

Dec. 11, 1991 [FR] France ............................... 91 15371

[51] Int. Cl.⁵ ............................................. B64C 25/60
[52] U.S. Cl. ......................... 244/104 FP; 188/322.15; 188/322.13
[58] Field of Search ......... 244/104 FP, 104 R, 102 R; 188/322.13–322.22, 285; 267/64.15–64.26

[56] References Cited

U.S. PATENT DOCUMENTS

| | | |
|---|---|---|
| 4,126,212 | 11/1978 | Crawley . |
| 4,506,869 | 3/1985 | Masclef et al. ............... 244/104 FP |
| 4,630,788 | 12/1986 | Yeaux et al. ................. 244/104 FP |
| 4,673,067 | 6/1987 | Munning et al. .................... 188/285 |
| 4,711,435 | 12/1987 | Harris et al. .................. 188/322.13 |
| 4,821,983 | 4/1989 | Aubry et al. ............... 244/104 FP |
| 4,974,707 | 12/1990 | Neumann et al. ............. 188/322.15 |
| 5,072,812 | 12/1991 | Imaizumi ....................... 188/322.15 |
| 5,085,300 | 2/1992 | Kato et al. .................... 188/322.15 |
| 5,123,506 | 6/1992 | Sirven ........................... 188/322.15 |

FOREIGN PATENT DOCUMENTS 2102749 3/1972 France .
2608242 12/1986 France .
2132313 7/1984 United Kingdom .

OTHER PUBLICATIONS

VFW-Fokker Hydraulics Aircraft Engineering vol. 46 No. 6 Jun. 1974 pp. 15–17.

*Primary Examiner*—Galen L. Barefoot
*Attorney, Agent, or Firm*—Sixbey, Friedman, Leedom & Ferguson

[57] ABSTRACT

The invention relates to a force-limiting device for aircraft landing gear shock absorbers, in particular for helicopters, and also to a shock absorber fitted with such a device. According to the invention, a box 201 is provided that forms a partition in the main body 101 of the shock absorber, the box having a bottom 202 whose central portion has a diaphragm 210 with small throttling orifices 211 and force-limiting members also being provided comprising firstly an annular valve member 225 disposed around the diaphragm 210 such that when open it allows a large volume of hydraulic fluid to pass through the box in a very short time, and a resilient return member 226 holding the annular valve member 225 in its closed position, but allowing the valve member to open above a predetermined threshold.

13 Claims, 2 Drawing Sheets

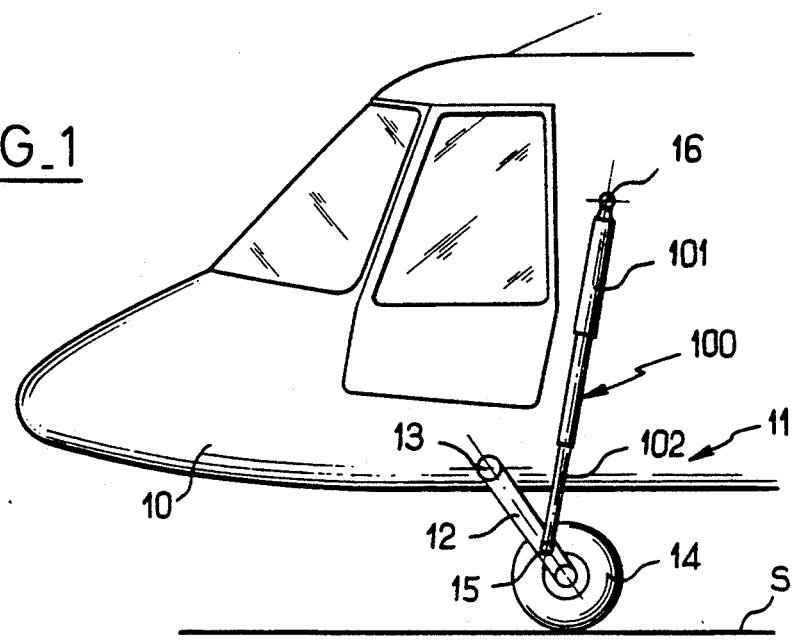
FIG_1
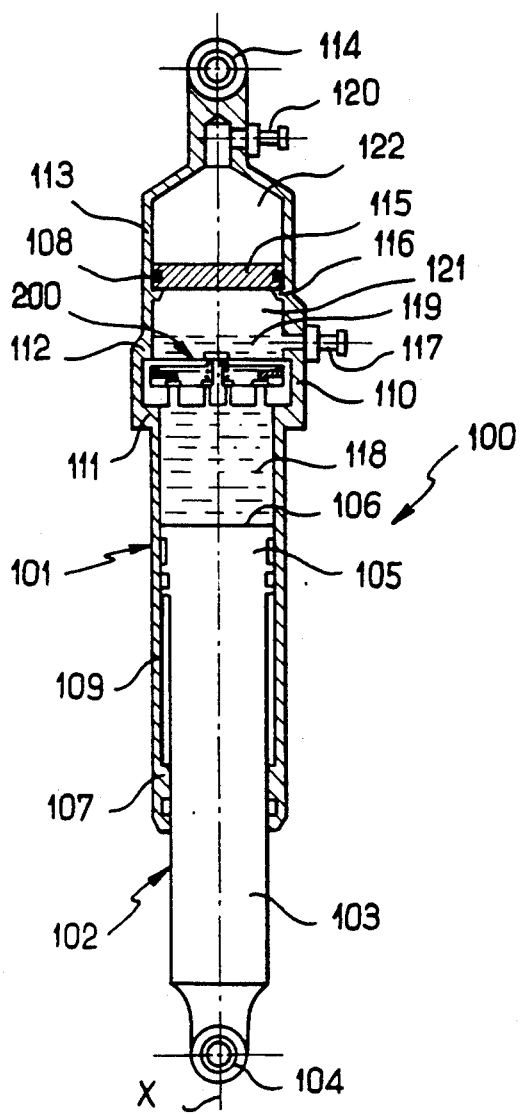
FIG_2

FORCE-LIMITING DEVICE FOR AN AIRCRAFT LANDING GEAR SHOCK ABSORBER, AND A SHOCK ABSORBER INCLUDING SUCH A DEVICE

The present invention relates to aircraft landing gear shock absorbers, in particular for helicopters, and more particularly it relates to means for limiting the forces transmitted in the event of a crash landing.

BACKGROUND OF THE INVENTION

In the particular case of helicopters, for example, there is a need to ensure force-limiting action in the system that is intended to absorb energy when the helicopter falls at high speed due to a failure of its support system. When the landing gear of a helicopter is of the rocking am type, the bottom end of the shock absorber is hinged to the rocking am and its top end is hinged to the structure of the helicopter, with the shock absorber being disposed substantially vertically so that reaction from the ground acts, via the associated wheel or wheels, tending to pivot the rocking am and to thrust the rod of the shock absorber into the body of said shock absorber. As a result, in the event of a crash landing, since the vertical impact speed is much greater than in normal operation, it becomes necessary to provide force limitation which is capable of coming into play as quickly as possible.

Numerous shock absorbers are already in existence, and some of them include force-limiting means that act in the event of excessive pressure.

In general, the shock absorbers used are of the type comprising a main body in which a rod-piston slides, associated firstly with a diaphragm hydraulic shock absorbing means that acts under normal conditions of use, and secondly with an energy absorbing means having two chambers containing gas under pressure, one of which is at low pressure and the other of which is at high pressure, said means being operative during a crash landing.

The force-limiting means that may optionally be provided are either included within a component on the shock absorber (e.g. a separator piston delimiting the volume of the high pressure chamber), or else they are constituted by a pressure release valve specially designed to act in the event of excess pressure due to the rod of the shock absorber being pushed into the body of the shock absorber at high speed.

An example of the first-mentioned type comprises a shock absorber having a main body at its bottom end and a rod-piston at its top end, the main body widening out downwards to form a high pressure chamber that is delimited by a separator piston which is in turn surmounted by a volume of oil. The rod-piston is hollow so as to delimit a low pressure top chamber adjacent to a volume of oil which is in communication with the oil contained in the chamber of the main body via a throttling device (an orifice through a partition) provided at the bottom end of the rod.

Under normal operating conditions, the vertical reaction from the ground causes the red to be pushed into the main body, thereby compressing the volume of gas contained in the low pressure chamber, with this retraction motion being braked by the throttling device. In contrast, in a crash landing, since the impact speed is much higher, the pressure generated by the throttling device is communicated via the oil from the cylinder to the separator piston, and since the pressure then applied to the separator piston exceeds the inflation pressure of the high pressure chamber, said piston moves downwards, compressing said chamber.

Forces are thus limited "naturally" by the separator piston.

Such a system is in use at present and provides satisfactory operation. However, the structure of the shock absorber lends itself poorly to long retraction strokes. In addition, in the event of a crash landing, oil flows both upwards (passing through the throttling orifice to penetrate into the hollow rod) and downwards (passing into the enlarged portion of the main body to move the separator piston downwards), and as a result hydrodynamic disturbances can be generated under certain conditions of impact.

An example of the second above-mentioned type of shock absorber comprises a shock absorber having a main body at the bottom and a rod-piston at the top, the main body including a high pressure chamber at its bottom end, which chamber is adjacent to a low pressure chamber, being separated therefrom by a flexible membrane that may bear against a perforated rigid support secured to said body, the shock absorber further including a throttling device that brakes displacement of the rod within the main body by throttling the fluid contained in said body and adjacent to the low pressure chamber. The rod-piston is hollow and receives a separator piston delimiting two hydraulic chambers.

One such shock absorber is described in the document FR-A-2 608 242.

The throttling device then provided (which is associated with a cylindro-conical tube that absorbs energy by plastic deformation) includes firstly a plurality of small through orifices organized in a circle and that act when the rod is pushed in at normal speeds, and secondly a central pressure relief valve of larger section than the above-mentioned orifices, said valve being kept in its closed position by conical resilient washers stacked on the rod of said valve, but acting to obtain a larger through passage in the event of the rod being pushed suddenly at high speed into the body of the shock absorber, thereby avoiding excess pressures that might cause damage.

Such a system nevertheless remains relatively complex, requiring several parts that must be adjusted accurately.

In addition, the throttling device suffers from drawbacks or limitations that are inherent to the disposition of the components from which it is made: the assembly comprising the valve rod and the conical resilient washers has relatively high inertia and exhibits friction that it is difficult to minimize, which means that very short response times are not possible, not to mention possible risks of the valve rod jamming. In addition, the flow section through the central opening remains limited (the diameter of the valve rod cannot be reduced too far without weakening it, and the central opening cannot be of very great diameter without the risk of excessively reducing the mechanical strength of the corresponding fixed component).

An object of the invention is to design force-limiting means that provide better performance than the known means outlined above, and capable of responding with a very short response time in the event of high impact speed (as occurs in a crash landing).

Another object of the invention is to design force-limiting means that make it possible simultaneously to provide considerable force limiting and accurate control of the associated headloss so as to control the force which is transmitted.

Another object of the invention is to provide a force-limiting device whose structure is simple and whose manufacturing cost is reasonable, while still being suitable for integration in shock absorbers of conventional design.

SUMMARY OF THE INVENTION

The present invention provides a force-limiting device for an aircraft landing gear shock absorber, said shock absorber being of the type comprising a main body in which a rod-piston slides, having both a diaphragm hydraulic shock absorbing means that acts under normal conditions of use and a two-chamber energy-absorbing means comprising one chamber containing gas at low pressure and another chamber containing gas at high pressure, which means acts during a crash landing, wherein the device comprises:

a box forming a partition for the main body of the shock absorber, said box having a bottom whose central portion includes a diaphragm with small throttling orifices;

an annular valve member disposed around the diaphragm and enabling a large volume of hydraulic fluid to pass therethrough in a very short time when it is open; and a resilient return member holding the annular valve member in its closed position and allowing said valve member to open above a predetermined threshold.

Preferably, the bottom of the box includes a plurality of small throttling orifices distributed around the axis of said bottom, and a plurality of large flow section orifices disposed concentrically around said throttling orifices. It is then advantageous for the large flow section orifices to be angularly distributed around the axis of the bottom of the box, and to open out into a common annular chamber which is closed by the annular valve member.

It is also advantageous for the annular valve member to be made in the form of a flat annular washer which is as light as possible, and which is disposed around a central washer that is loaded by an associated return spring to close said small throttling orifices, said central washer having small through holes for throttling during relaxation. In particular, the resilient return member associated with the annular valve member should be considerably stiffer than the return spring associated with the central washer.

It is also preferable for the resilient return member associated with the annular valve member to be made in the form of a spring-disk having a central through opening with an inside edge bearing against said annular valve member, and with an outside edge bearing against an associated flange of the box. It is then advantageous for the assembly constituted by the annular valve member and the spring-disk to be of minimal mass in order to enable said annular valve member to open very quickly.

According to another advantageous feature, the inside and outside edges of the spring-disk are shaped to limit friction forces during opening of the annular valve member. In particular, the inside and outside edges of the spring-disk may form toroidal beads. These beads may be integrally molded with the remainder of the spring-disk, which is then made as a single piece, or in a variant, they may be constituted by rings added thereto.

Also preferably, the flange is interrupted by lateral openings through the box so that, when the annular valve member is open, hydraulic fluid can flow both through the central opening in the spring-disk and via said lateral openings, by passing round said spring-disk.

The invention also provides a shock absorber for the landing gear of an aircraft, in particular of a helicopter, the shock absorber comprising a main body in which a rod-piston slides, including both a diaphragm hydraulic shock absorbing means that acts under normal conditions of use, and a two-chamber energy-absorbing means comprising one chamber containing gas at low pressure and another chamber containing gas at high pressure, which means acts during a crash landing, the shock absorber being remarkable in that it includes a force-limiting device as defined above, with the box thereof fixed in the main body, the bottom of said box co-operating with the end face of the rod-piston to delimit a hydraulic fluid chamber, and also being surmounted by a volume of hydraulic fluid which is adjacent to the low pressure chamber, said low pressure chamber also being delimited by a separator piston which also serves to delimit the adjacent high pressure chamber.

It is then preferable for the rod-piston to be disposed at its bottom end and the main body at its top end, said rod-piston being hinged at its bottom end to a component of the landing gear, and said main body being hinged at its top end to the structure of the aircraft. In particular the bottom of the box constitutes an end-of-stroke abutment for the rod-piston when the piston moves into the body during a crash landing.

BRIEF DESCRIPTION OF THE DRAWINGS

An embodiment of the invention is described by way of example with reference to the accompanying drawings, in which:

FIG. 1 is a diagrammatic elevation view of rocker arm type landing gear for a helicopter, and fitted with a force-limiting device in accordance with the invention;

FIG. 2 is an axial section view through such a shock absorber having a force-limiting device;

DETAILED DESCRIPTION

Figure 3:
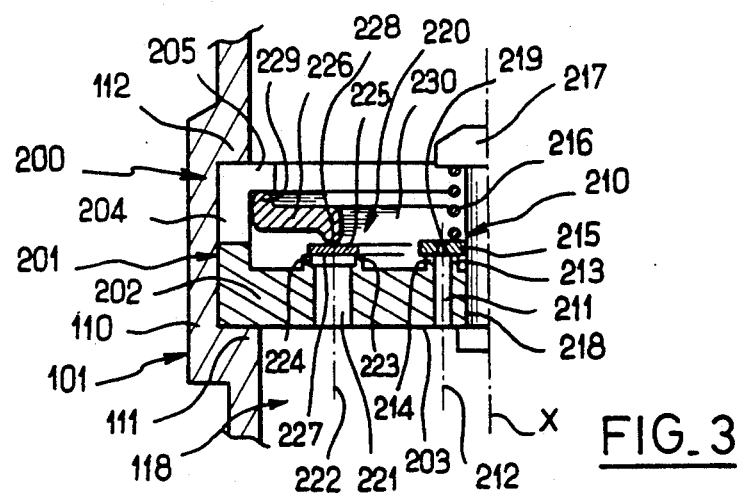
FIG. 3 is a fragmentary axial half-section for more clearly distinguishing the structure of the functional assembly forming both the diaphragm and the force-limiting valve member (both the valve member of the central diaphragm and the force-limiting annular valve member being closed in this case)

FIG. 1 shows a shock absorber 100 having a force-limiting device in accordance with the invention and fitted in this case to a rocker arm type landing gear 11 of a helicopter 10. The landing gear 11 includes a rocker arm 12 hinged at its top end 13 to the structure of the helicopter 10 and supporting one or more wheels 14 at its opposite end. The shock absorber 100 comprises a main body 101 in which a rod-piston 102 slides, the main body 101 being disposed in this case at the top of the shock absorber and being hinged at 16 via an associated ball-and-socket joint to the structure of the helicopter, while the rod-piston 102 disposed at the bottom of the shock absorber is hinged at its bottom end 15 via a ball-and-socket joint to the rocker arm 12 of the landing gear. When the wheel 14 makes contact with the ground S, the vertical reaction from the ground on the wheel causes the rocker arm 12 of the landing gear to pivot about its hinge, thereby pushing the rod-piston into the main body of the shock absorber. In normal use, the shock absorber 100 of the landing gear is preferably substantially vertical.

FIG. 2 shows more clearly the structure of the shock absorber 100 fitted to the helicopter landing gear shown in FIG. 1. The shock absorber 100 comprises a main body 101 about an axis X, and having a preferably solid rod-piston 102 slidably mounted therein. The rod-piston 102 slides in the bottom portion 109 of the main body 101, being guided by a smooth shoulder 107 provided at the bottom end of the main body 101. The rod-piston 102 includes an associated main portion 103 having one end 104 organized as a ball joint endpiece for hinging to the rocker arm of the landing gear, and having an opposite end 105 organized in the form of a piston. The main body 101 includes an intermediate portion 110 associated with supporting a functional assembly 200 forming both a diaphragm and a force-limiting valve member, and its structure is described in greater detail with reference to FIG. 3. The intermediate portion 110 of the main body 101 is provided for this purpose with a bottom shoulder 111 and a top shoulder 112 that secure the above-mentioned functional assembly 200 in the axial direction. Finally, the main body 101 extends in the form of a top portion 113 which is terminated by a ball joint endpiece 114 which is associated with the connection of the main body to the structure of the helicopter.

A chamber 118 is delimited at its bottom end by the top face 106 of the rod-piston 102, and at its top end by the functional assembly 200. The chamber 118 is filled with a corresponding volume of hydraulic fluid. Above the functional assembly 200 there is a volume 119 of hydraulic fluid having a free surface that delimits the bottom of a chamber 121 that contains gas under pressure (usually nitrogen), which gas is at a low pressure, said chamber being delimited at its top end by a separator piston 115 and an associated gasket 108. The separator piston 115 wipes the inside surface of the top portion 113 of the main body 101, thereby making it possible to delimit an adjacent chamber 122 that also contains gas under pressure, e.g. nitrogen, but this time under high pressure. When the shock absorber 100 is used under normal conditions, the pressure that exists in the low pressure chamber 121 is less than the pressure which exists in the high pressure chamber 122, such that the separator piston 115 remains pressed against a flange 116 formed for this purpose inside the top portion 113 of the main body 101. The flange 116 thus defines the rest position of the separator piston 115 under drive from the pressure difference between the high pressure chamber 122 and the low pressure chamber 121. A conventional type of valve 120 enables the chamber 122 to be inflated with gas at high pressure. The low pressure chamber 121 is delimited at its top end by the separator piston 115 (and the associated gasket 108), and at its bottom end by the hydraulic fluid whose level is adjusted by an associated valve 117. This valve 117 also serves for inflating the low pressure chamber 121 with nitrogen.

When landing takes place at a normal vertical speed, part of the hydraulic fluid contained in the chamber 118 is forced through the functional assembly 200, and more particularly through the diaphragm portion of said assembly. The volume of nitrogen in the low pressure chamber 121 is thus reduced and the pressure in said chamber increases while the speed of the rod-piston 101 diminishes. The high pressure chamber 122 therefore does not have an effect during such normal operation, since the pressure threshold of the high pressure chamber is not reached. However, in the event of a crash landing, the ground reaction acts via the wheels to rock the rocker arm about its pivot point and to force the rod-piston 102 into the main body of the shock absorber 100 at a much higher speed: it is under these circumstances that the functional assembly 200 must be capable of passing a large volume of hydraulic fluid in a short period of time while simultaneously very accurately controlling the corresponding headloss so as to control the force that is transmitted. Transferring such a large volume of hydraulic fluid quickly through the functional assembly 200 makes it possible to reduce the volume of nitrogen in the low pressure chamber 102 quickly so that the pressure in said chamber increases quickly to reach and exceed the inflation pressure of the high pressure chamber 122, thereby causing the separator piston 115 to be pushed in, which piston compresses the high pressure chamber 122 so as to make use of the volume available in said chamber.

The shock absorber returns to its initial position with the separator piston 115 possibly moving down until it engages the associated flange 116, and with expansion throttling being performed by the diaphragm portion of the functional assembly 200 so as to brake the outwards movement of the rod-piston 102.

The functional assembly 200 is now described in greater detail. It is the structure of the functional assembly 200 that enables it to perform both the function of a diaphragm and the function of a force-limiter.

The structure of the assembly is first described with reference to FIG. 3, after which its operation in normal mode and in crash landing mode is described with reference to FIGS. 3 and 5, respectively.

The assembly 200 comprises a box 201 forming a partition in the main body 101 of the shock absorber, said box having a bottom 202 whose central portion includes a diaphragm 210 having small throttling orifices 211 on axes 212 that are distributed around the axis X of said bottom (which coincides with the main axis of the shock absorber), with each of the small orifices extending from the bottom face 203 of the bottom of the box to a top opening that is delimited by two concentric shoulders 213 and 214. A central washer 215 loaded by an associated return spring 216 is provided to close all of the small throttling orifices 211 simultaneously. A central bolt 217 passes through the bottom 202 of the box via a central bore 218 therein, and serves simultaneously to guide the central washer 215 during movements thereof, and to hold the associated return spring 216 in place. Finally, the central washer 215 has a plurality of small holes 219 disposed facing the throttling orifices 211 (but with much smaller flow sections than said orifices), said small holes being associated with throttling the hydraulic fluid while the shock absorber is relaxing.

The general structure of such hydraulic diaphragm shock absorber means is indeed well known to the person skilled in the art, but it should nevertheless be observed that the small throttling orifices 211 are disposed in this case in the middle region of the bottom of the box, so as to leave room to organize the force-limiting means around the diaphragm while having a maximum amount of radial space available for organizing the orifices associated with said force-limiting function.

In accordance with an essential aspect of the invention, the functional assembly 200 includes force-limiting means 220 essentially constituted by an annular valve member 225 disposed around the diaphragm 210, said valve member making it possible (when open) to pass a large volume of hydraulic fluid in a very short time, and by a resilient return member 226 that holds the annular valve member 225 in its closed position, said return member allowing said valve to open above a predetermined threshold.

The bottom 202 of the box 201 thus preferably includes a plurality of small throttling orifices 211 distributed around the axis X of said bottom (with the axes 212 of said orifices lying on a cylinder about the axis X), together with a plurality of orifices 221 of large flow section, which orifices are disposed concentrically around the throttling orifices 211. A plurality of orifices 221 are thus provided having axes 222 that lie on another cylinder about the axis X. It would naturally be possible to provide the orifices 221 with sections that are circular or otherwise, the number and the section of said orifices being selected as a function of the flow rate that is desired when said force-limiting members come into play. For example, a set of four to six throttling orifices 211 may be provided, each having a diameter of about 3 mm, together with as large a number as possible of orifices 221 of large flow section, e.g. 12 orifices of diameter that may reach 8 mm to 10 mm. The large flow section orifices 221 are preferably angularly distributed around the axis X of the bottom of the box, and they also open out into a common annular chamber 227 delimited by two concentric shoulders 223 and 224, which chamber is closed by the annular valve member 225. Such a disposition is favorable to obtaining the desired flow of a large volume of hydraulic fluid in a very short time, while also obtaining very accurate control of headloss past the annular valve member in order to control the force that is transmitted.

The annular valve member 225 is preferably in the form of a flat annular washer which is as light as possible, and which is disposed around the central washer 215 associated with the diaphragm portion of the functional assembly 200. Such an embodiment is favorable to obtaining minimum inertia, thereby enabling the force-limiting annular valve member to be raised quickly with minimum response time. The annular valve member 225 which is subjected to drive from the associated resilient return member 226 should nevertheless be sufficiently stiff to ensure that it provides good sealing during normal operation of the shock absorber. In practice, the central washer 215 and the annular washer 225 are preferably made of metal or of any other equivalent synthetic material.

The resilient return member 226 naturally constitutes a fundamental component of the force-limiting system. This resilient return member is considerably stiffer than the return spring 216 associated with the central washer 215, i.e. with the diaphragm function. It is preferable to use a high-strength steel for making the return member 226. Given the three-dimensional disposition of the annular valve member 225 and the very high stiffness that is desired, it becomes very difficult to organize resilient return of said annular valve member by means of one or more helical springs. The structure of the resilient return member 226 shown in the drawings constitutes a particularly advantageous embodiment insofar as it is compatible with obtaining minimum mass for the assembly comprising the annular valve member and its return member while also obtaining accurate control over headloss by the annular valve member, thereby making interfering effects upstream and downstream from said annular valve member practically negligible. The resilient return member 226 is, in this example, made in the form of a spring-disk, having a through central opening 230, an inside edge 228 which bears against the annular valve member 225, and an outside edge 229 which bears against an associated flange 205 of the box 201. The spring-disk 226 is designed to present a predetermined force-displacement relationship so as to enable its stroke as a function of force to be optimized depending on the desired result. This predetermined relationship may be linear or it may correspond to a curve that is determined by calculation.

It is also appropriate to keep friction forces as small as possible while the annular valve member 225 is being lifted. For this purpose, it is advantageous for the inside and outside thrust edges 228 and 229 of the spring-disk 226 to be specially shaped for this purpose, e.g. by forming toroidal beads thereon that face towards the corresponding thrust faces, as shown in FIG. 3. The toroidal beads referenced 228 and 229 in FIG. 3 may be integrally formed of the same material as the central portion of the spring-disk 226, in which case it comprises a one-piece component. In a variant, as shown in FIG. 3, thrust beads 228.1 and 229.1 may be provided in the form of add-on O-rings, said rings optionally being secured by gluing or welding to corresponding grooves formed in the central portion of the spring-disk 226. It is then preferable for the O-rings to be made of metal.

FIG. 3 also shows one of the side openings 204 of the box 201 forming à gap in the thrust flange 205 associated with the spring-disk 226. Such side openings 204 facilitate obtaining a very high flow rate of hydraulic fluid during an extremely short time: when the annular valve member 225 is open, the hydraulic fluid can then flow not only via the central opening 230 of the spring-disk 226, but also via the lateral openings 204 of the box 201, i.e. passing round the periphery of the spring-disk.

The operation of the functional assembly 200 is now described with reference to FIGS. 4 and 5, which figures respectively show said functional assembly in normal use an in the event of a crash landing.

Figure 4:
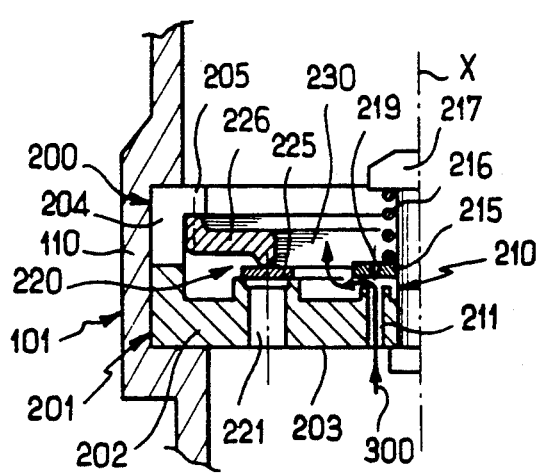
FIGS. 4 and 5 are half-sections showing the above functional assembly, respectively in normal use (central diaphragm member open, force-limiting annular valve member closed), and during a crash landing (both valve members open)

In FIG. 4, landing takes place at a normal vertical speed, i.e. the pressure exerted by the hydraulic fluid when the red-piston moves into the main body of the shock absorber is sufficient to raise the central washer 215 against the action of the associated return spring 216, but is not sufficient for causing the force-limiting members to operate, i.e. it is not sufficient to raise the annular valve member 225 against the action of the associated return spring-disk 226. The hydraulic fluid therefore passes through the bottom 202 of the box 201 by passing via the associated small throttling orifices 211, thereby achieving the diaphragm function in conventional manner. The flow of hydraulic fluid is represented by arrow 300. From this position, returning to the normal position takes place when the central washer 215 moves back downwards until it presses against the associated seat, after which, during relaxation, the hydraulic fluid is throttled as it passes through the associated small hole 210 to pass back through the bottom 202 of the box 201. Under such conditions, the high pressure chamber of the shock absorber is not brought into play, since the pressure threshold of said chamber is not reached.

Figure 5:
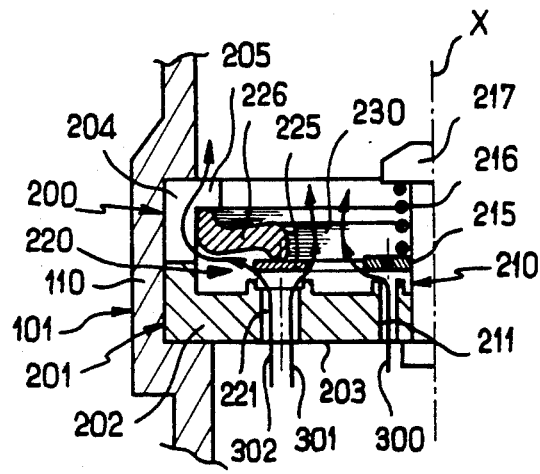
Figure 6:
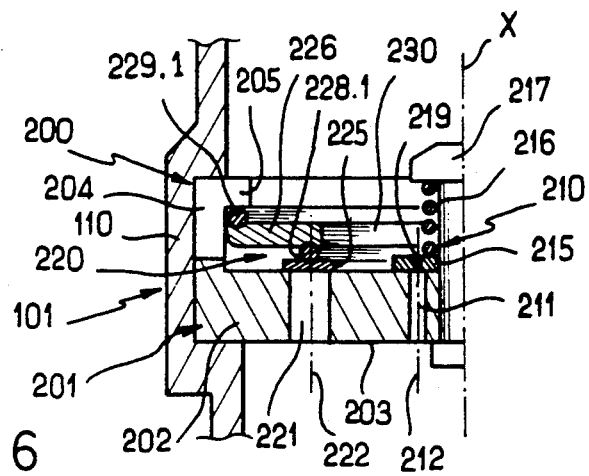
FIG. 6 is an axial half-section analogous to that of FIG. 3 showing a variant of the spring disk of the force-limiting device, having inside and outside edges constituted by add-on O-rings.

FIG. 5 shows a situation that occurs during a crash landing at much higher impact speed. Under such circumstances, the pressure induced by the small throttling orifices 211 in the bottom chamber 118 of the shock absorber is transmitted via the large flow section orifices 221 and the associated pressure balancing annular chamber 227. The threshold imposed by the spring-disk 226 is thus rapidly reached, whereupon the annular valve member 225 lifts almost instantaneously thus allowing hydraulic fluid to flow under controlled force and with a pressure differential that falls off progressively when the flow rate between the above-mentioned chamber 118 and the low pressure chamber of the shock absorber diminishes. The flow of hydraulic fluid through the bottom 202 of the box 201 thus takes place mainly via the large flow section orifices 221, with a first flow going past the annular washer 225 of its inside (as represented by arrow 301) thus passing through the central opening 230 of the spring-disk 226, and with another flow going past said annular valve member via its outside (as represented by arrow 302) then flowing outside the spring-disk 226 via the lateral opening 204 in the box. Such an organization allows a large volume of oil (several liters) to flow in a very short time (about one-tenth of a second) with headloss past the annular valve member 225 being controlled very accurately, thereby controlling the force transmitted. The flow sections provided thus make it possible to obtain large flow passages upstream and downstream of the annular valve member, with flow taking place at a high rate. It should be observed that the bottom 202 of the box 201 constitutes an end-of-stroke abutment for the rod-piston 102 when it moves in during a crash landing.

By way of example, a helical return spring with stiffness of about 20 N/mm may be used for the diaphragm function, and a spring-disk with stiffness of about 50,000 N/mm may be used for the force-limiting function. The corresponding forces are respectively about 100 N and about 25,000 N. It can thus be seen that ratio between the stiffnesses of the two springs in the functional assembly is about 2,500. By using a shock absorber of the same dimensions as those normally used for rocker arm type helicopter landing gear, it is possible to obtain a hydraulic fluid flow rate of about 2,500 liters per minute. Such a disposition makes it possible, in practice, to reduce the maximum force peak transmitted during a crash landing by at least half.

Force-limiting means can thus be made which are capable of responding with extremely short response times in the event of high impact speeds, and which make it possible simultaneously to provide significant force limiting and accurate control of the associated headloss, thus making it possible to achieve extremely accurate control of the force transmitted.

Such a force-limiting device is also extremely reliable insofar as the force-limiting members are most unlikely to jam, and have minimum inertia, thereby enabling the annular valve member to rise extremely quickly, and thus achieving a minimum response time that is extremely satisfactory in practice. Finally, the force-limiting device is simple in structure, having a small number of component parts, and is easily integrated in shock absorbers initially lacking such force-limiting devices.

The invention is not limited to the embodiments described above, but on the contrary it extends to any variant that reproduces the essential characteristics specified above with equivalent means.

We claim:

1. A force-limiting device for an aircraft landing gear shock absorber, said shock absorber being of the type comprising a main body in which a rod-piston slides, having both a diaphragm hydraulic shock absorbing means that acts under normal conditions of use and a two-chamber energy-absorbing means comprising one chamber containing gas at low pressure and another chamber containing gas at high pressure, which means acts during a crash landing, wherein the device comprises:

a box forming a partition for the main body of the shock absorber, said box having a bottom which includes a plurality of small throttling orifices distributed around the axis of said bottom, and a plurality of large flow section orifices disposed concentrically around said throttling orifices;

a central valve member that is loaded by an associated return spring to close said small throttling orifices;

an annular valve member disposed around said central valve member and being loaded by an associated resilient return member to close said large flow section orifices, said resilient return member holding the said annular valve member in its closed position and allowing said annular valve member to open above a predetermined threshold, then enabling a large volume of hydraulic fluid to pass through said large flow section orifices in a very short time.

2. A force-limiting device according to claim 1, wherein the large flow section orifices are angularly distributed around the axis of the bottom of the box, and open out into a common annular chamber which is closed by the annular valve member.

3. A force-limiting device according to claim 1, wherein the annular valve member is made in the form of a flat annular washer which is as light as possible, and the central valve member is made in the form of a central washer having small through holes for throttling during relaxation.

4. A force-limiting device according to claim 1, wherein the resilient return member associated with the annular valve member is considerably stiffer than the return spring associated with the central valve member.

5. A force-limiting device according to claim 1, wherein the resilient return member associated with the annular valve member is made in the form of a spring-disk having a central through opening with an inside edge bearing against said annular valve member, and with an outside edge bearing against an associated flange of the box.

6. A force-limiting device according to claim 5, wherein the assembly constituted by the annular valve member and the spring-disk is of minimal mass in order to enable said annular valve member to open very quickly.

7. A force-limiting device according to claim 5, wherein the inside and outside edges of the spring-disk are shaped to limit friction forces during opening of the annular valve member.

8. A force-limiting device according to claim 7, wherein the inside and outside edges of the spring-disk form toroidal beads.

9. A force-limiting device according to claim 8, wherein the beads are constituted by add-on O-rings.

10. A force-limiting device according to claim 5, wherein the flange is interrupted by lateral openings through the box so that, when the annular valve member is open, hydraulic fluid can flow both through the central opening in the spring-disk and via said lateral openings, by passing round said spring-disk.

11. A shock absorber for the landing gear of an aircraft, in particular of a helicopter, the shock absorber comprising a main body in which a rod-piston slides, including both a diaphragm hydraulic shock absorbing means that acts under normal conditions of use, and a two-chamber energy-absorbing means comprising one chamber containing gas at low pressure and another chamber containing gas at high pressure, which means acts during a crash landing, the shock absorber including a force-limiting device which comprises:

- a box fixed in the main body to form a partition for said main body, the bottom of said box co-operating with the end face of the rod-piston to delimit a hydraulic fluid chamber, and also being surmounted by a volume of hydraulic fluid which is adjacent to the low pressure chamber, said low pressure chamber also being delimited by a separator piston which also serves to delimit the adjacent high pressure chamber, said bottom further including a plurality of small throttling orifices;
- an annular valve member disposed around the diaphragm and enabling a large volume of hydraulic fluid to pass therethrough in a very short time when it is open; and
- a resilient return member holding the annular valve member in its closed position and allowing said valve member to open above a predetermined threshold in a very short time.

12. A shock absorber for landing gear according to claim 11, wherein the rod-piston is disposed at its bottom end and the main body at its top end, said rod-piston being hinged at its bottom end to a component of the landing gear, and said main body being hinged at its top end to the structure of the aircraft.

13. A shock absorber for landing gear according to claim 12, wherein the bottom of the box constitutes an end-of-stroke abutment for the rod-piston when the piston moves into the body during a crash landing.

* * * * *